Feb. 16, 1926. Re. 16,264

G. A. SCHIEREN

SAFETY RAZOR

Original Filed Dec. 28, 1921

INVENTOR

G. Arthur Schieren

BY

Geo. H. Myers

ATTORNEY

Reissued Feb. 16, 1926. Re. 16,264

UNITED STATES PATENT OFFICE.

GEORGE ARTHUR SCHIEREN, OF GREAT NECK, NEW YORK.

SAFETY RAZOR.

Original No. 1,445,452, dated February 13, 1923, Serial No. 525,393, filed December 28, 1921. Application for reissue filed September 8, 1924. Serial No. 736,452.

*To all whom it may concern:*

Be it known that I, GEORGE ARTHUR SCHIEREN, a citizen of the United States, residing at Beachleigh, Great Neck, in the county of Nassau and State of New York, have invented certain new and useful Improvements in Safety Razors, of which the following is a specification.

The present invention relates particularly to safety razors of the Gillette type wherein a flexible and elastic blade is provided with cutting edges that are adjustable toward or from the guard member of the razor. This adjustment of the cutting edges of the blade is accomplished by turning the handle of the razor to the desired position with relation to the head of the razor and thereby flexing the blade. Each user of such a razor finds that there is some particular setting of the blade which is most satisfactory to him. In actual practice however, after the user has shaved, assuming the blade to be in correct position during the operation, when the razor is taken apart for cleansing, the former correct position or adjustment of the blade is lost. When the razor is again to be used, the former correct position of the blade can only be secured by trial and frequent changes in the adjustment of the blade. Moreover, blades used in such razors differ materially in thickness, and soap or other material may be allowed to accumulate between the blade and the guard plate or clamp plate, factors which add to the difficulty of making a uniform and satisfactory setting of the razor each time it is used.

The primary object of my invention is the provision of means by which the blade may be adjusted to exactly the same angle, every time it is used and regardless of its thickness, thus insuring at all times a known and correct adjustment of the blade, and eliminating loss of time and annoyance otherwise attendant upon the adjustment of the blade by trial each time the razor is used.

To this end, the invention consists essentially in the combination with the handle and head of a razor of this type, of an index member rotatably adjustable on the handle and complementary to a stationary index member or mark on the guard plate or other portion of the head of the razor, by means of which, in a manner hereinafter described, a uniform adjustment of the blade may be secured with facility and convenience, regardless of variations in the thickness of different blades, or of soap or other material between the blade and the guard plate or clamp plate.

In the accompanying drawing I have illustrated one complete example of the physical embodiment of my invention wherein the parts are combined and arranged according to the best mode I have thus far devised for the practical application of the principles of my invention. It will be understood however, that changes and alterations may be made in the device as shown without departing from the spirit of my invention, and within the scope of my appended claims.

Figure 1:
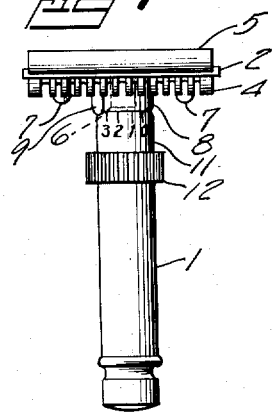
Fig. 1 is a view in side elevation of a safety razor embodying my present invention

In the preferred form of the invention as illustrated in the drawings, a safety razor of the Gillette type is shown having the rotatable handle 1 and flexible elastic blade 2, provided with the opposed cutting edges, 3, 3, the blade being detachable for cleansing or replacement, and adjustable with relation to the guard plate 4.

The flexible elastic blade 2 is clamped between the guard plate 4, and the clamp plate 5 which has a central screw threaded bolt 6 which passes through the opening 6′ in the guard plate 4; and the clamp plate 5 also has a pair of spaced posts 7 that pass through guide openings 7′ in the guard plate.

The handle 1 is provided with a threaded socket head 8 which is adapted to receive the threaded bolt 6; and it will be apparent that, by turning the handle 1, the blade 2, which is clamped between the clamp plate 5 and the guard plate 4, will be flexed, and its cutting edges 3, 3, adjusted with relation to the guard plate 4, in order to secure the proper or desired shaving position of the edges of the blade.

Figure 2:
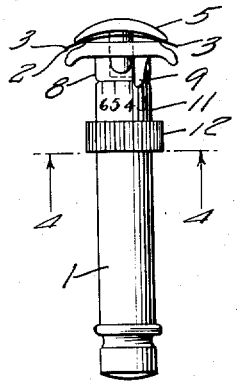
Fig. 2 is an edge view of the razor, at right angles to Fig. 1.
Figure 3:
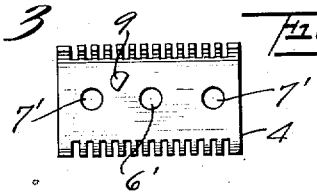
Fig. 3 is a bottom plan view of the guard plate of the razor.

In the embodiment of the invention shown in Figures 1 to 5, I provide a stationary index member in the form of a finger or pointer 9 which may be integral with or firmly secured to the guard plate 4 at one side of the central opening 6′ therein, and which projects a sufficient distance below the guard plate 4, as shown in Figures 1 and 2, to cooperate with a rotatably adjustable index member in the form of a sleeve 11 mounted on the handle 1 in a manner which will now be described.

Figure 4:
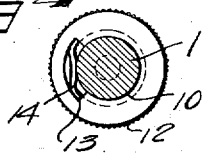
Fig. 4 is a transverse sectional view at line 4—4 of Fig. 2.

Between the body of the handle 1 and its socket head 8, I provide a reduced portion or neck 10, having a cylindrical periphery, about which the sleeve 11 is rotatably adjustable. The sleeve 11 has thereon a series of index figures 0, 1, 2, 3, 4, etc., and marks, adapted to register with the stationary index member 9; and the sleeve 11 may be provided with a knurled head 12, to facilitate turning of the sleeve. The sleeve 11 is free to be rotated about the neck 10 of the handle 1, but is provided with a frictional connection with the handle sufficient to hold the sleeve in adjusted position and prevent accidental displacement of said sleeve under normal conditions. An adequate frictional engagement between the sleeve 11 and the neck 10 of the handle 1 is insured by milling out or otherwise fashioning an annular groove 13 of proper dimensions in the head 12 of the sleeve 11, and by placing a flat spring 14 within said groove 13. In Figure 4, the spring 14 is shown with its ends located in the ends of the groove 13 and bearing against the outer wall of said groove, and with the central portion of the spring 14 in close frictional contact with the periphery of the neck portion 10 of the handle 1. Before being inserted in the groove 13, the spring 14 is in the form of a bow with its ends curving to the left, as viewed in Figure 4, but when placed in the groove 13, and in contact with the neck portion 10 of the handle, said spring 14 assumes the position shown in Figure 4 with its ends firmly engaging the ends of the groove 13 and its central portion in close frictional contact with the neck 10 of the handle 1. To permit the assembling of the sleeve 11 on the reduced portion or neck 10 of the handle 1, the socket head 8 and neck 10 of the handle are preferably made integral and separable from the main portion of the handle. Because of this frictional connection between the sleeve 11 and the neck portion 10 of the handle, the sleeve may be rotated with the thumb and fingers, but will be sufficiently held to prevent accidental displacement.

In using, for the first time, the form of the invention shown in Figures 1 to 5, the handle 1, with its head 8 in engagement with the bottom of the guard plate 4, is turned until the blade 2 is gently held without flexure between the guard plate 4 and the clamp plate 5. The user then rotates sleeve 11 until the notation "0" thereon is in alignment with one side of the finger 9. Without disturbing the setting of the sleeve 11, the handle 1 is then screwed up until the user finds by experience what flexure of the blade 2 gives the most satisfactory shaving results. When he has determined this, the user observes and makes a mental note of the index figure on the sleeve 11, perhaps "3", which is in alignment with the finger 9. The razor may now be dismantled and cleansed; and yet the user may re-assemble it, either with the same blade or another blade of different thickness, with assurance that the previous satisfactory setting of the blade may be accomplished by screwing up the handle until the blade is gently held between the guard plate 4 and the clamp plate 5, then setting the sleeve 11 with the index figure "0" in line with the finger 9, and then screwing up on the handle until the noted and remembered index figure "3" is in alignment with the finger 9.

Figure 6:
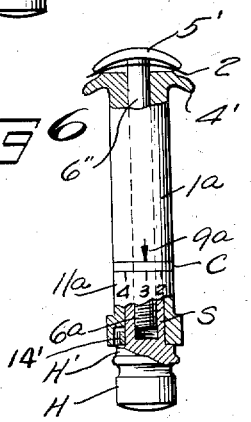
Fig. 6 is a modified form of the invention.
Figure 5:
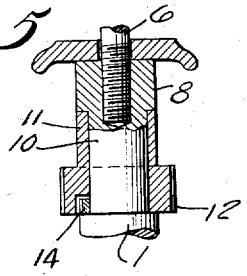
Fig. 5 is an enlarged, detail sectional view, partly in elevation showing the relation of the adjustable sleeve of the index device, on the razor handle

In the modification of the invention shown in Figure 6 of the drawings, wherein parts are broken away for convenience of illustration, the guard plate 4′ is provided with a sleeve $1^a$ made integral therewith. The handle H, which in effect forms a continuation of the sleeve $1^a$, has a socket head S which receives the threaded end $6^a$ of the central threaded bar 6″ which is integral with the clamp plate 5′ and passes through the sleeve $1^a$; and the handle H is thus utilized for adjusting the blade 2 between the clamp plate 5′ and the guard 4′. The socket head S has a reduced diameter, and an enlarged end collar C which frictionally engages the lower end of the sleeve $1^a$ as shown. A rotatably adjustable index sleeve $11^a$, is mounted on the socket head S between the collar C and the annular shoulder H′ of the handle H; and said index sleeve $11^a$ is frictionally held on the socket head S by means of a spring 14′, arranged in a manner similar to the arrangement of the spring 14 in the form of the invention shown in Figures 1 to 5.

Index characters, such as 0, 1, 2, 3, 4, etc., are impressed or stamped on the sleeve $11^a$, as shown in Figure 6, and are adapted to register with the arrow $9^a$ on the lower end of the sleeve $1^a$, across the comparatively narrow collar C. In the form of the invention shown in Figure 6, the adjustment of the blade 2 is accomplished by turning the handle H on the threaded end $6^a$ of the bar or stem 6″ extending from the clamp plate 5′. The index sleeve $11^a$, which is rotatable upon the socket head S of the handle H, may be used in the same manner as the sleeve 11 in the device of Figures 1 to 5 hereinbefore described.

From the above description taken in connection with my drawings, it will be apparent that I have provided a razor of the type mentioned with an index device that is compactly arranged, inexpensive in cost of manufacture, and simple, but efficient in performing its required functions.

Having thus fully described my invention, what I claim as new and desire to secure by Letters Patent is:

1. In a razor of the Gillette type having a guard, a clamp plate having a threaded bolt, a handle adapted to cooperate with said guard and provided with a threaded socket adapted to receive said bolt, a rotatably adjustable sleeve swiveled on said handle, and cooperating index marks and an index, on the sleeve and a fixed part of the razor.

2. In a razor of the Gillette type having a guard, a clamp plate having a threaded bolt, a handle adapted to cooperate with said guard and provided with a threaded socket adapted to receive said bolt, a rotatably adjustable sleeve swiveled on said handle, cooperating index marks and an index, on the sleeve and a fixed part of the razor, and means for frictionally retarding the rotating movement of said sleeve.

3. In a razor of the Gillette type having a guard, a clamp plate having a threaded bolt, a handle adapted to cooperate with said guard and provided with a threaded socket adapted to receive said bolt, said handle being provided with a reduced portion, a rotatably adjustable sleeve cooperating with the reduced portion of said handle and bearing index marks, and a stationary index on said guard with which said sleeve cooperates.

4. In a razor the combination of a clamp plate having a threaded stem, a blade, a guard, a threaded handle having a socket-head, said head being in contact with the guard, an index sleeve on the handle and below said head, resilient means between the sleeve and handle, and a single index in connection with the guard, whereby a predetermined width and angle of the cutting blade is reset by a single adjustment.

In testimony whereof, I affix my signature.

GEO. ARTHUR SCHIEREN.